(12) United States Patent
Kim et al.

(10) Patent No.: US 7,524,237 B2
(45) Date of Patent: Apr. 28, 2009

(54) DIAMOND TOOL BLADE WITH CIRCULAR CUTTING EDGE

(76) Inventors: George A. Kim, 4754 N. Jennys Rd., Indianapolis, IN (US) 46228; James Andrew Simonson, 125 Lynn Ct., Zionsville, IN (US) 46077

( * ) Notice: Subject to any disclaimer, the term of this patent is extended or adjusted under 35 U.S.C. 154(b) by 0 days.

(21) Appl. No.: 11/858,768

(22) Filed: Sep. 20, 2007

(65) Prior Publication Data

US 2008/0026678 A1    Jan. 31, 2008

Related U.S. Application Data

(62) Division of application No. 11/422,518, filed on Jun. 6, 2006, now Pat. No. 7,390,242.

(60) Provisional application No. 60/712,132, filed on Aug. 29, 2005.

(51) Int. Cl.
*B24B 7/04* (2006.01)

(52) U.S. Cl. ............... 451/285; 451/290; 407/64; 407/119

(58) Field of Classification Search ............... None
See application file for complete search history.

(56) References Cited

U.S. PATENT DOCUMENTS

| | | |
|---|---|---|
| 1,800,308 A | 4/1931 | Maynard |
| 2,600,815 A | 6/1952 | Turner |
| 2,633,675 A | 4/1953 | Ellis |
| 2,836,939 A | 6/1958 | White |
| 3,088,254 A | 5/1963 | Lipkins |
| 3,239,967 A | 3/1966 | Volk |
| 3,305,282 A | 2/1967 | Arneson |
| 3,374,586 A | 3/1968 | Stone |
| 3,472,565 A | 10/1969 | Arneson |
| 3,624,969 A | 12/1971 | Dalton |
| 3,816,997 A | 6/1974 | Rupp |
| 4,104,441 A * | 8/1978 | Fedoseev et al. ............ 428/408 |
| 4,161,846 A | 7/1979 | Whang |
| 4,264,249 A | 4/1981 | Dawson |

(Continued)

FOREIGN PATENT DOCUMENTS

BE    690482    5/1967

(Continued)

OTHER PUBLICATIONS

Yashu et al., "Cutting Characteristics in Edge Moving Type of Long Life Precision Cutting Method," Proc. of 5th euspen International Conference—Montpellier, France, May 2005, pp. 595-598.

(Continued)

*Primary Examiner*—Maurina Rachuba
(74) *Attorney, Agent, or Firm*—Barnes & Thornburg LLP

(57) ABSTRACT

An apparatus for turning a hard and/or brittle material includes a precision workpiece spindle, a workpiece support, a hard and/or brittle workpiece rigidly coupled to the workpiece support, and a diamond tool blade rigidly coupled to a spin-turner mechanism. The diamond tool blade is formed to include a cutting edge arranged to confront the hard and/or brittle workpiece to remove material from the workpiece to form precision-turned components such as optical lenses, mirrors, and optical molds.

21 Claims, 2 Drawing Sheets

U.S. PATENT DOCUMENTS

| | | | | |
|---|---|---|---|---|
| 4,581,969 | A | 4/1986 | Kim | |
| 4,643,161 | A | 2/1987 | Kim | |
| 4,697,489 | A | 10/1987 | Kim | |
| 4,829,716 | A | 5/1989 | Ueda et al. | |
| 4,866,885 | A * | 9/1989 | Dodsworth | 51/293 |
| 4,993,195 | A | 2/1991 | Gray | |
| 5,092,083 | A | 3/1992 | Raffaelli | |
| 5,105,584 | A | 4/1992 | Gray | |
| 5,158,147 | A | 10/1992 | Pavey et al. | |
| 5,231,587 | A | 7/1993 | Frost | |
| 5,347,763 | A | 9/1994 | Miyamato et al. | |
| 5,468,268 | A * | 11/1995 | Tank et al. | 51/293 |
| 5,678,967 | A | 10/1997 | Savoie | |
| 5,697,994 | A * | 12/1997 | Packer et al. | 51/309 |
| 5,868,885 | A * | 2/1999 | Crockett et al. | 156/89.27 |
| 5,919,013 | A | 7/1999 | Savoie | |
| 5,957,637 | A | 9/1999 | Savoie | |
| 6,227,952 | B1 * | 5/2001 | Diehl et al. | 451/140 |
| 6,276,994 | B1 | 8/2001 | Yoshida et al. | |
| 6,325,165 | B1 * | 12/2001 | Eyre | 175/426 |
| 6,575,674 | B2 * | 6/2003 | Papajewski | 408/145 |
| 6,698,415 | B2 * | 3/2004 | Garcia et al. | 125/12 |
| 6,705,806 | B2 * | 3/2004 | Okamura et al. | 407/119 |
| 6,733,369 | B1 | 5/2004 | Stacklies et al. | |
| 6,796,877 | B1 | 9/2004 | Bingham et al. | |
| 6,852,414 | B1 * | 2/2005 | Frushour | 428/408 |
| 6,865,787 | B2 | 3/2005 | Shingai et al. | |
| 6,872,120 | B2 | 3/2005 | Miyazawa et al. | |
| 6,926,598 | B2 | 8/2005 | Toge et al. | |
| 2002/0194955 | A1 * | 12/2002 | Fang et al. | 75/240 |
| 2004/0229553 | A1 | 11/2004 | Bechtold et al. | |

FOREIGN PATENT DOCUMENTS

| | | |
|---|---|---|
| CA | 786704 | 11/1966 |
| CA | 866657 | 3/1971 |
| DE | 1575365 | 10/1966 |
| FR | 1501594 | 11/1966 |
| FR | 1577916 | 9/1969 |
| GB | 1168649 | 10/1969 |
| GB | 1228636 | 4/1971 |
| IT | 789343 | 10/1967 |
| JP | 595585 | 1/1984 |
| JP | 623945 | 1/1987 |
| NO | 126396 | 1/1973 |
| SE | 451610 | 10/1987 |

OTHER PUBLICATIONS

"Success With CBN100P Round Indexable Inserts," Industrial Diamond Review, Feb. 2006, two pages.

* cited by examiner

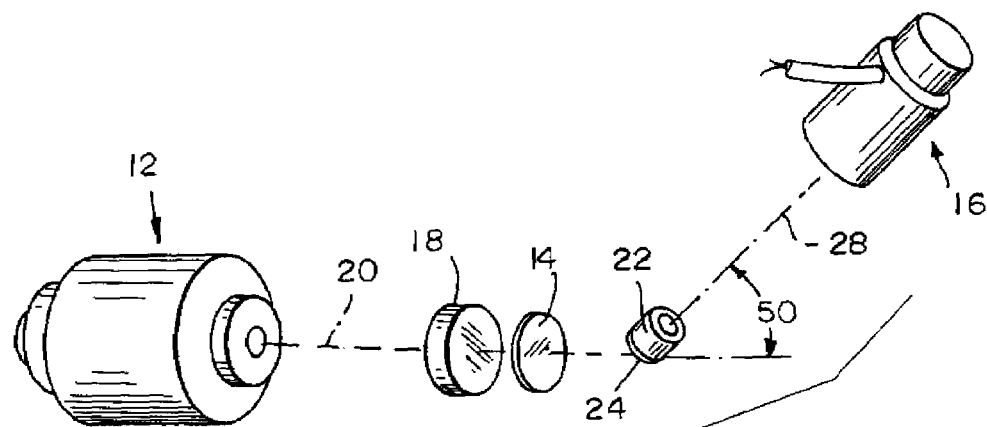
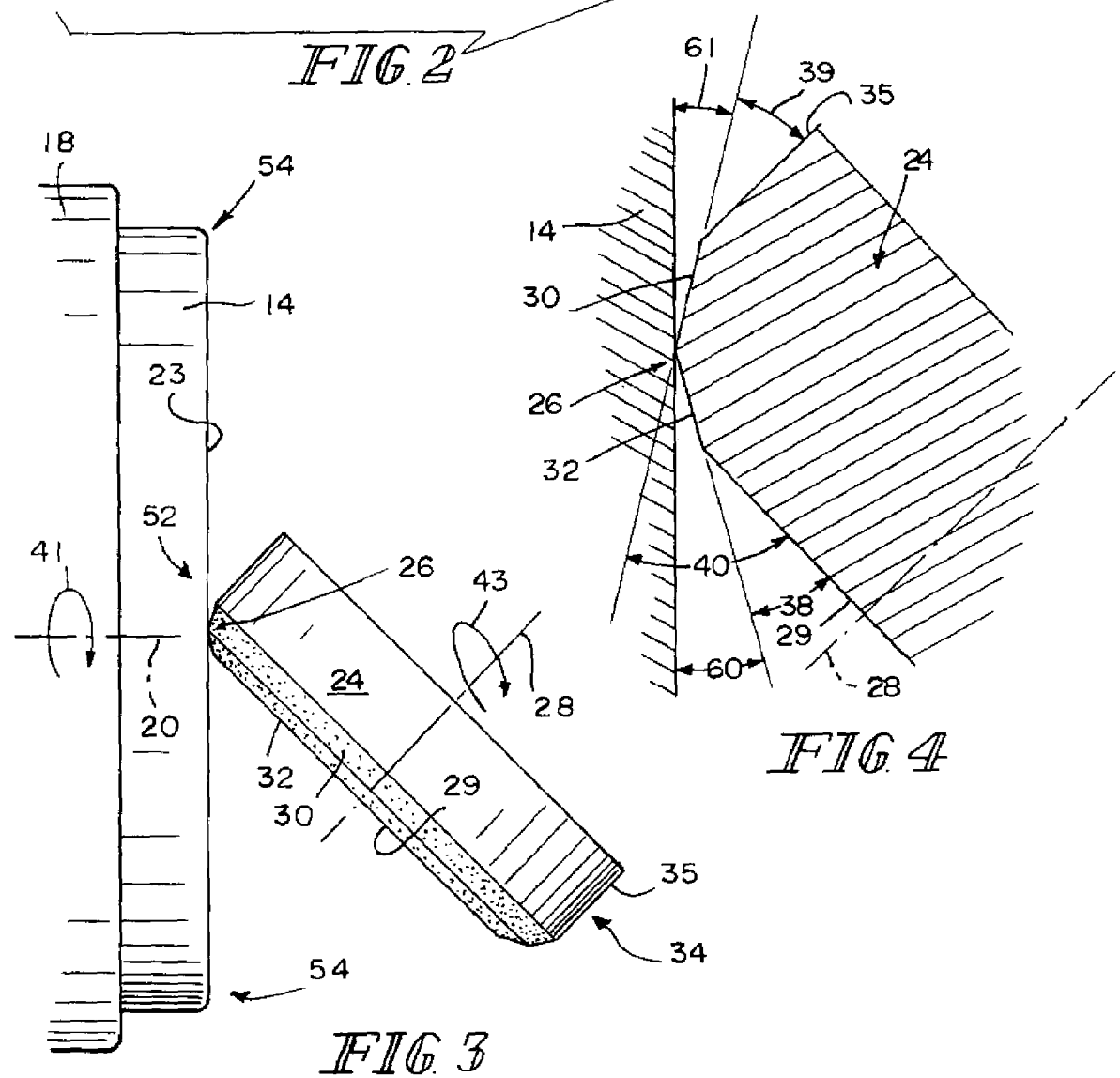

DIAMOND TOOL BLADE WITH CIRCULAR CUTTING EDGE

The present application is a division of U.S. application Ser. No. 11/422,518, filed Jun. 6, 2006, which claims the benefit of U.S. Provisional Application No. 60/712,132, filed Aug. 29, 2005, which applications are hereby incorporated by reference herein.

BACKGROUND

This disclosure relates to precision turning tools, and, in particular, to diamond precision turning tools. More particularly, the present disclosure relates to a diamond precision turning tool for turning hard and brittle materials.

SUMMARY

According to the present disclosure, an apparatus for turning a hard and/or brittle material includes a precision workpiece spindle, a workpiece support, a hard and/or brittle workpiece rigidly coupled to the workpiece support, and a diamond tool blade rigidly coupled to a spin-turner mechanism. The diamond tool blade is formed to include a cutting edge arranged to confront the hard and/or brittle workpiece to remove material from the workpiece to form precision-turned components such as optical lenses, mirrors, and optical molds.

In illustrative embodiments, the diamond tool blade is annular in shape to provide a continuous cutting edge through 360° of blade rotation. Additionally, the workpiece is coupled to a precision workpiece spindle such that the hard and brittle workpiece is rotating as the diamond tool blade is removing material therefrom.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 2 is an exploded perspective view of components included in the apparatus of FIG. 1 showing (from left to right) a precision workpiece spindle, a workpiece support, a workpiece, a diamond tool blade with circular cutting edge, and a spin-turner mechanism;

FIG. 3 is an enlarged side elevation view of some of the components shown in FIG. 2, with portions broken away, showing the workpiece rotating about a turning axis and the circular cutting edge of the diamond tool blade confronting the workpiece while rotating about a non-parallel spinning axis; and FIG. 4 is a further enlarged side elevation view of the components shown in FIG. 3, with portions broken away, showing the diamond tool blade confronting the workpiece at an edge defined by an intersection of two beveled surfaces formed on the diamond tool blade so that a hard and brittle workpiece can be machined.

DETAILED DESCRIPTION OF THE DRAWINGS

Figure 1:
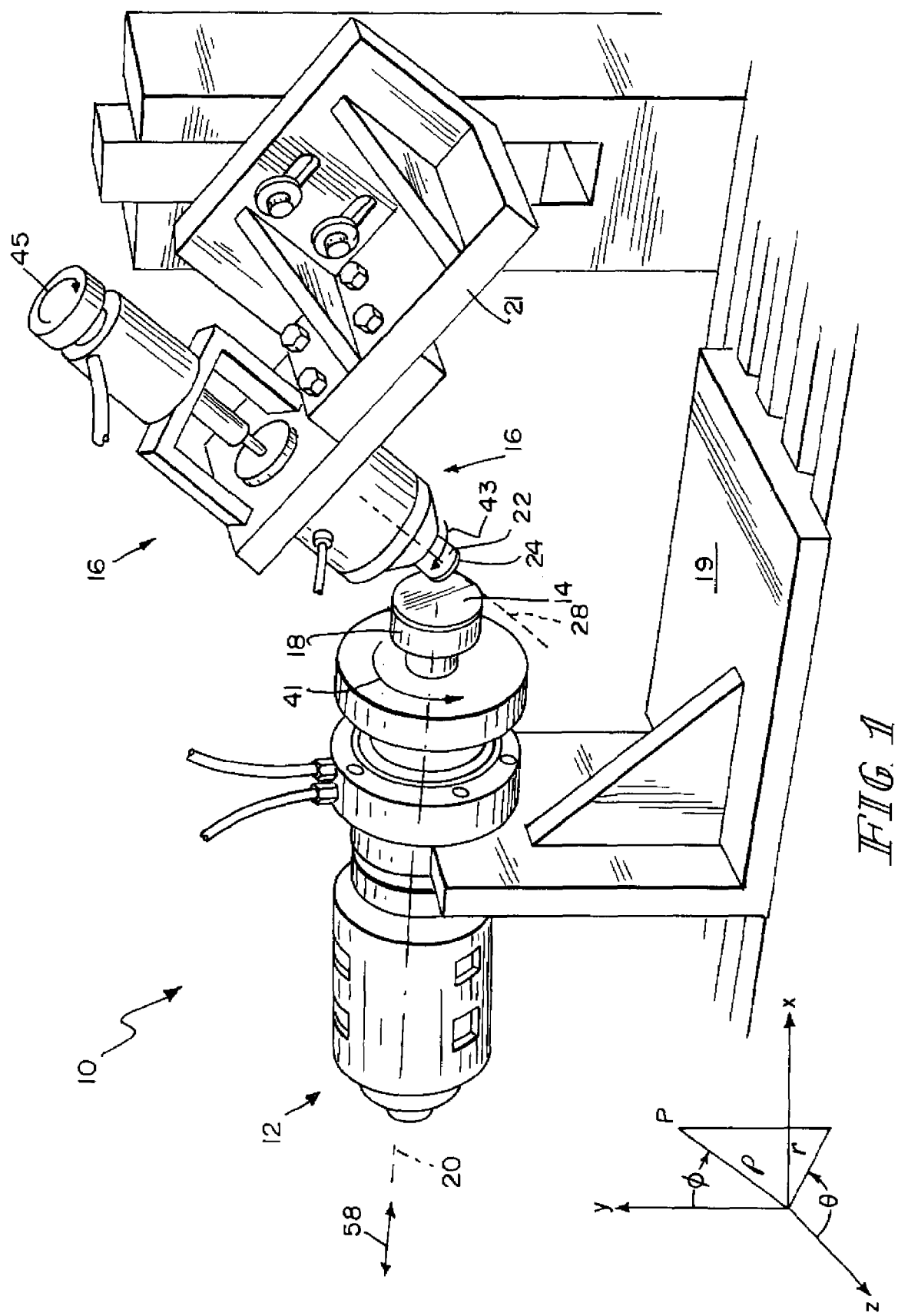
FIG. 1 is perspective view, with portions broken away, showing the apparatus including a diamond tool blade with circular cutting edge.

An apparatus 10 for turning a hard and/or brittle material includes a precision workpiece spindle 12 configured to hold a hard and/or brittle workpiece 14, a diamond tool blade 24, and a spin-turner mechanism 16 as shown, for example, in FIG. 1. Apparatus 10 is configured to remove material from hard and/or brittle workpiece 14 to form, for example, a precision optical lens from hard and brittle workpiece 14.

Workpiece spindle 12 includes a workpiece support 18 coupled to precision workpiece spindle 12. Workpiece spindle 12 may be an air spindle or an oil hydrostatic spindle. Hard and/or brittle workpiece 14 is rigidly coupled to workpiece support 18 by conventional means to cause workpiece 14 to rotate about turning axis 20 at a predetermined speed as shown in FIG. 1. Illustratively, workpiece 14 is disk-shaped having a planar work surface 23. Spindle 12 is conventionally coupled to a support platform 19 to allow rotation of workpiece 14 about turning axis 20. Illustratively, movement of spin-turner mechanism 16 can be made in a variety of controlled directions including x, y, z, and P (where a point P is defined by the spherical coordinates $(\rho,\theta,\phi)$ and the rectangular coordinates (x, y, z)) of spin-turner mechanism 16 depending on the complexity of apparatus 10. In some embodiments contemplated by this disclosure, it may be desirable to configure workpiece spindle 12 and workpiece 14 to move directionally, similar to spin-turner mechanism 16.

Spin-turner mechanism 16 includes a tool blade support 22 coupled to spin-turner mechanism 16 as suggested in FIG. 1. A diamond tool blade 24 formed to include a circular cutting edge 26 is coupled to tool blade support 22 to cause diamond tool blade 24 to rotate about a spinning axis 28 at a predetermined speed range of about less than 1 to about 100 revolutions per minute (RPM), while workpiece 14 rotates at a predetermined speed range of about 500 to 2,000 RPM. The predetermined speed range of about 100 RPM of diamond tool blade 24 with a depth of cut of about 4-10 microns for a roughing cut, while speeds of about 1 revolution/pass with a depth of cut of about 1 micron for a finished cut.

Spin-turner mechanism 16 is arranged to allow circular cutting edge 26 to confront hard and/or brittle workpiece 14 such as, for example, polycrystalline alumina ($Al_2O_3$). Spin-turner mechanism 16 is coupled to a support platform 21 to allow a number of angular positions of diamond tool blade 24 with respect to workpiece 14.

Diamond tool blade 24 may be made of a chemically faceted multi-modal polycrystalline diamond (PCD) hot isostatically pressed ("HIP'ed") in a cobalt binder of about 10% cobalt. Multi-modal PCD (mmPCD) comprises diamond crystals and/or diamond particles varying in size of about 2 .mu.m to 50 .mu.m. In illustrative embodiments, tool blade 24 is made of a two-part mmPCD (two sizes of diamond crystals/particles), available from DeBeers Industrial Diamond Products Division, to increase abrasion resistance. Chemical faceting of diamond tool blades is well known in the art such as that disclosed in U.S. Pat. Nos. 4,581,969; 4,643,161; and 4,697,489, the disclosures of which are incorporated herein by reference. As disclosed in the '161 patent, chemical faceted surfaces are faceted by machining using a scaife having a machining compound deposited on the scaife surface and wherein the machining occurs in the present of a machining gas such as Oxygen, Argon, $N_2O$, or the like. Chemical faceting of diamond tool blade 24 may produce an almost 1,000× magnification cutting edge (1,000 .times. quality means no visible edge chips or defects when viewed at 1,000× magnification).

In the illustrative embodiment, diamond tool blade 24 is configured to be an annular disc about 1.0 to 3.0 inches in diameter. Tool blade 24 is rigidly coupled to a tool blade support 22 by conventional means and configured to rotate about a spinning axis 28. Referring now to FIGS. 3 and 4, tool blade 24 includes a circular cutting edge 26 arranged to have 360° of cutting edge, a planar top surface 29, a nose facet 30, a negative rake facet 32, and a base portion 34 having an annular side wall 35. Circular cutting edge 26 is defined by the intersection of nose facet 30 and negative rake facet 32. Nose facet 30 and negative rake facet 32 comprise conical surfaces formed at an intersection of annular side wall 35 and planar top surface 29.

With respect to the geometry of cutting edge 26, a dihedral angle 38 between planar top surface 29 and negative rake facet 32 is about 25° (also known as "chamfer" or conical rake). A dihedral angle 39 between nose facet 30 and side wall 35 is about 35° chamfer which provides an effective clearance angle 61 of about 15°. Thus, an effective rake angle 60 is formed at an intersection of negative rake facet 32 and planar work surface 23. Illustratively, effective rake angle 60 is about 15°. An effective clearance angle 61 is formed at an intersection of nose facet 30 and planar work surface 23. Illustratively, effective clearance angle 61 is about 15°. These angles together with the angle of the spin-tuner axis with respect to the workpiece are well-suited to remove material from a workpiece made of, for example, polycrystalline alumina. Work pieces constructed of other substrates may require a different cutting edge geometry.

Spinning axis 28 is arranged to form an angle with respect to turning axis 20 and a planar surface 48 of hard and/or brittle workpiece 14. Thus an angle 50 formed by the intersection between spinning axis 28 and turning axis 20 is about 45°, as shown in FIGS. 2 and 4.

Predetermined angles between negative rake facet 32, nose facet 30, angle 50 (angle between spinning axis 28 and turning axis 20), and workpiece 14, in combination with rotation speeds and directions of both workpiece 14 and tool blade 24 may vary based upon the composition of workpiece 14. In one illustrative embodiment suggested in FIGS. 1 and 3, a workpiece 14 constructed of polycrystalline alumina is rotated in a direction 41 (counter-clockwise) about turning axis 20. Diamond tool blade 24 is rotated in a direction 43 (clockwise) about spinning axis 28 to position cutting edge 36 in proximity to a center portion 52 of workpiece 14. Referring now to FIG. 1, as workpiece 14 and diamond tool blade 24 are rotated, workpiece spindle 12 is moved in a direction Z to cause diamond tool blade 24 to move toward perimeter edge 54 of workpiece 14 outwardly away from axis 58 to remove material from workpiece 14. Likewise, workpiece spindle 12 may be moved in a linear direction X to vary the depth of cut of material removed from workpiece 14. It may be desirable in some embodiments to initially position cutting edge 26 in proximity to workpiece 14 adjacent to perimeter edge 54 and move cutting edge 26 toward center portion 52 to remove material from workpiece 14. Additionally, it may be desirable to rotate diamond tool blade 24 in a counter-clockwise direction when removing material based upon the composition of workpiece 14. In some embodiments contemplated by this disclosure, diamond tool blade 24 and spin-turner mechanism 16 may be moved in a linear direction to remove material from workpiece 14 while workpiece spindle 12 and workpiece 14 remain in a static position with respect to diamond tool blade 24.

As with any cutting device, cutting edge 26 becomes "dull" with use. Therefore, since center portion 52 rotates at a slower speed than perimeter edge 54, with some compositions, it may be desirable to begin the material removal at center portion 52 and move workpiece spindle 12 and workpiece 14 in direction Z so as to cause diamond tool blade 24 to remove material from center portion 52 outwardly toward perimeter edge 54. By moving workpiece spindle 12 and workpiece 14 in direction Z the "sharper" cutting edge 26 confronts a slower rotating portion of workpiece 14 for material removal.

Hard and/or brittle workpiece 14 may be turned in two phases. First, a roughing cut is performed for fast material removal. In the roughing-cut phase, spin-turner mechanism 16 rotation speed is faster (about 100 RPM) to reduce localized tool edge heating and to allow for faster workpiece 14 rotation speeds and machine feeds. The roughing cut phase provides for deeper depths of cut but at reduced levels of surface finish quality (where quality is defined as a level of surface imperfections).

In a second, or finished-cut phase, spin-turner mechanism 16 rotational speed is set so that one rotation or less of spin-turner mechanism 16 occurs as diamond tool blade 24 moves across workpiece 14 (e.g., one hour for spin-turner mechanism 16 to traverse workpiece 14 results in a rotational speed would be one revolution/hour). Spin-turner mechanism 16 rotational direction is chosen to cause a "sharp/un-worn" cutting edge 26 to continuously rotate into a cutting zone defined by contact between cutting edge 26 and workpiece 14 to cause the surface finish quality to be better than that of the roughing cut phase.

In another operation contemplated by this disclosure, a single-crystal diamond is used to form the cutting edge 26. It may be desirable to use a single-crystal diamond cutting edge on a very hard workpiece 14 such as, for example, silicon, where a surface finish of about sixty angstrom root-mean-square (rms) roughness is desired. In this turning operation the spin-turner 16 rotational speed is set so that about 10° to about 15° of arc of the single-crystal diamond tool blade 24 is exposed to confront the silicon workpiece 14 rotating at a speed of about 1 revolution per 15 minutes. The single-crystal diamond cutting edge 26 may be well-suited for turning an oblique perimeter edge of the silicon workpiece 14.

The invention claimed is:

1. An apparatus for turning a hard and brittle material, the apparatus comprising a base including a workpiece spindle adapted to receive a hard and brittle workpiece coupled for rotation about a first axis, a spin-turner mechanism movable among multiple direction to confront the hard and brittle workpiece and supported for rotation to establish a second axis oriented to lie in a non-parallel relation to the first axis, a diamond tool blade formed to include a circular cutting edge and coupled to the spin-turner mechanism and wherein the diamond tool blade includes first and second chemically faceted surfaces intersecting to define the circular cutting edge, the diamond tool blade being made of two-part multi-modal polycrystalline diamonds varying in size of about 2 μm to about 50 μm, hot isostatically pressed in a cobalt binder of about 10% cobalt whereby the chemical faceted surfaces are faceted by machining using a scaife having a machining compound deposited on the scaife surface and wherein the machining occurs in the presence of a machining gas, and wherein the diamond tool blade is annular in shape and includes space-apart planar top and bottom surfaces and an annular side wall extending therebetween, the first chemically faceted surface defining a negative rake facet formed on an upper portion of the annular side wall adjacent to an outer rim of the planar top surface, a base portion formed on the side wall adjacent to an outer rim of the bottom surface, and the second chemically faceted surface defining a nose facet extending between the negative rake facet and the base portion.

2. The apparatus of claim 1, wherein an intersection between the nose facet and the negative rake facet defines the circular cutting edge.

3. The apparatus of claim 1, wherein a dihedral angle defined by the negative rake facet and the planar top surface is about 25°.

4. The apparatus of claim 1, wherein a dihedral angle defined by the nose facet and the annular side wall is about 35°.

5. The apparatus of claim 1, wherein an effective clearance angle defined by the negative rake facet and a planar work surface formed on the hard and brittle workpiece is about 15° and an effective clearance angle defined by the nose facet and the planar work surface is about 15°.

6. The apparatus of claim 1, wherein an included angle defined by the first common axis and the second common axis is about 45°.

7. The apparatus of claim 1, wherein the nose facet and the negative rake facet are conical surfaces formed at an intersection of the annular side wall and the planar top surface.

8. The apparatus of claim 1, wherein the diamond tool blade is configured as an annular disc.

9. An apparatus for turning a hard and brittle material, the apparatus comprising
   a base including a workpiece spindle adapted to receive a hard and brittle workpiece coupled for rotation about a first axis,
   a movable spin-turner mechanism coupled to the base,
   a diamond tool blade having a 360° cutting edge coupled to the spin-turner mechanism for rotation about a second non-parallel axis, the diamond tool blade including first and second chemically faceted surfaces intersecting to define the 360° cutting edge configured to confront the hard and brittle workpiece, the diamond tool blade being made of two-part multi-modal polycrystalline diamonds varying in size of about 2 μm to about 50 μm, and hot isostatically pressed in a cobalt binder of about 10% cobalt
   whereby the chemical faceted surfaces are faceted by machining using a scaife having a machining compound deposited on the scaife surface and wherein the machining occurs in the presence of a machining gas,
   wherein the diamond tool blade is annular in shape and includes spaced-apart planar top and bottom surfaces and a side wall extending therebetween, the first chemically faceted surface defining a negative rake facet formed on an upper portion of the side wall adjacent to an outer rim of the planar top surface, a base portion formed on the side wall adjacent to an outer rim of the bottom surface, and the second chemically faceted surface defining a nose facet extending between the negative rake facet and the base portion, and
   wherein the angle between the nose facet and the rake facet is greater than 90°.

10. The apparatus of claim 9, wherein a dihedral angle defined by the negative rake facet and the planar top surface is about 25°.

11. The apparatus of claim 9, wherein a dihedral angle defined by the nose facet and the annular side wall is about 35°.

12. The apparatus of claim 9, wherein an effective clearance angle defined by the negative rake facet and a planar work surface formed on the hard and brittle workpiece is about 15° and an effective clearance angle defined by the nose facet and the planar work surface is about 15°.

13. The apparatus of claim 9, wherein the diamond tool blade is coupled to the spin-turner mechanism for rotation therewith about a first common axis and the hard and brittle workpiece is coupled to the workpiece spindle for rotation therewith about a second common axis, and an included angle defined by the first common axis and the second common axis is about 45°.

14. The apparatus of claim 9, further comprising a workpiece made of silicon and wherein the diamond tool blade is configured to move from a center portion of the workpiece toward a perimeter edge of the workpiece to remove material therefrom.

15. The apparatus of claim 9, wherein a first phase roughing cut is defined by the diamond tool blade rotating at about 100 revolutions per minute.

16. The apparatus of claim 15, wherein a second phase finished-cut is defined by the diamond tool blade rotating at a speed of up to one rotation of the diamond tool blade to traverse the extent of the workpiece.

17. The apparatus of claim 9, wherein a first phase roughing cut is defined by the diamond tool blade rotating at about 100 revolutions per minute and a second phase finished-cut is defined by the diamond tool blade rotating at a speed of up to one rotation of the diamond tool blade to traverse the extent of the workpiece.

18. The apparatus of claim 9, wherein the diamond tool blade is configured as an annular disc.

19. he apparatus of claim 4, wherein an effective clearance angle defined by the nose facet and a planar work surface formed on the hard and brittle workpiece is about 15°.

20. The apparatus of claim 11, wherein an effective clearance angle defined by the nose facet and a planar work surface formed on the hard and brittle workpiece is about 15°.

21. An apparatus for turning a hard and brittle material, the apparatus comprising
   a base including a workpiece spindle adapted to receive a hard and brittle workpiece coupled for rotation about a first axis,
   a spin-turner mechanism movable among multiple directions to confront the hard and brittle workpiece and supported for rotation to establish a second axis oriented to lie in a non-parallel relation to the first axis,
   a diamond tool blade formed to include a circular cutting edge and coupled to the spin-turner mechanism and wherein the diamond tool blade includes first and second chemically faceted surfaces intersecting to define the circular cutting edge, the diamond tool blade being made of two-part multi-modal polycrystalline diamonds varying in size of about 2 μm to about 50 μm, hot isostatically pressed in a cobalt binder of about 10% cobalt,
   wherein the diamond tool blade is annular in shape and includes spaced-apart planar top and bottom surfaces and an annular side wall extending therebetween, the first chemically faceted surface defining a negative rake facet formed on an upper portion of the annular side wall adjacent to an outer rim of the planar top surface, a base portion formed on the side wall adjacent to an outer rim of the bottom surface, and the second chemically faceted surface defining a nose facet extending between the negative rake facet and the base portion, and
   wherein the angle between the nose facet and the rake facet is greater than 90°.

* * * * *